United States Patent
Nagao et al.

(10) Patent No.: US 7,134,789 B2
(45) Date of Patent: Nov. 14, 2006

(54) ROLLER CHAIN AND GUIDE UNIT HAVING THE SAME THEREIN

(75) Inventors: Shouji Nagao, Kanagawa-ken (JP); Hiroaki Izumi, Kanagawa-ken (JP); Noriaki Kataoka, Kanagawa-ken (JP)

(73) Assignee: Nippon Thompson Co., Ltd., Tokyo (JP)

(*) Notice: Subject to any disclaimer, the term of this patent is extended or adjusted under 35 U.S.C. 154(b) by 131 days.

(21) Appl. No.: 11/028,513

(22) Filed: Jan. 4, 2005

(65) Prior Publication Data

US 2005/0152625 A1 Jul. 14, 2005

(30) Foreign Application Priority Data

Jan. 14, 2004 (JP) ............................. 2004-006604

(51) Int. Cl.
*F16C 29/06* (2006.01)
(52) U.S. Cl. ...................................................... 384/44
(58) Field of Classification Search ................ 384/44, 384/45, 43; 464/168
See application file for complete search history.

(56) References Cited

FOREIGN PATENT DOCUMENTS

| JP | 10-110728 | 4/1998 |
|---|---|---|
| JP | 2001165169 | 6/2001 |

*Primary Examiner*—Lenard A. Footland
(74) *Attorney, Agent, or Firm*—Browdy and Neimark, PLLC (57) ABSTRACT

A roller chain is provided, which is composed of more than one roller and a carrier belt. The roller chain helps make sure of keeping the rollers against moving on the skew even under carrying high loads while the carrier belt is made to have a large space to reserve lubricant sufficient to ensure good lubrication. The carrier belt is comprised of a pair of continuous bands lying to carry or bear axially opposite ends of the roller across an area set off-center from an axis of the roller, and more than one U-type separator to join the continuous bands together with one another. The U-type separators 6 are each composed of a pair of legs joined together with their associated continuous bands, and a horizontal bridge interconnecting the sidewise spaced leg with each other.

10 Claims, 6 Drawing Sheets

ROLLER CHAIN AND GUIDE UNIT HAVING THE SAME THEREIN

FIELD OF THE INVENTION

The present invention relates to a chain of rollers, hereinafter called "roller chain", comprised of more than one rolling element of cylindrical roller and a carrier belt to keep the rolling element therein, and also relates to a guide unit comprised of a guide rail, a slider that fits over the guide rail for movement relative to the guide rail by virtue of the rolling elements, and the roller chain installed to roll through a recirculation circuit made between the slider and the guide rail.

BACKGROUND OF THE INVENTION

The recently remarkable advance in robotization technology in many industrial machines extensively requires any guide unit that is high in sliding performance as well as operational speed. To cope with the requirements stated earlier, the roller chain has been developed in which more than one rolling element of cylindrical roller is held in the retainer to keep any adjacent rolling elements from coming into direct engagement with one another, and also there have been practically developed the linear motion guide units having therein the roller chain constructed as stated earlier.

A roller chain of the type as recited earlier is known as disclosed in, for example Japanese Patent Laid-Open No. 1998-110728. The prior roller chain is comprised of more than one cylindrical roller adapted to roll through a recirculation circuit in close succession, a separator adapted to space any two adjacent rollers away from one another, and a flexible belt adapted to connect the successive separators to each other. Any two adjacent separators come into sliding contact with the circular outside surface of the roller rolling between the leading and trailing separators, thereby keeping the successive rollers in spaced parallel relation to make certain of the smooth rolling of the roller throughout the recirculation circuit. With the prior roller chain constructed as stated earlier, the separators come into the circular outside surface of the associated roller across an axial overall length of the roller to keep the roller against moving on the skews, especially serving to keep the roller in the direction normal to the traveling direction in the recirculation circuit.

Another example of the conventional chain of rolling elements is disclosed in, for example Japanese Patent Laid-Open No. 2001-165169 in which a plurality of rolling elements is received in recesses formed in an elongated carrier belt for free rotation, one to each recess. The carrier belt is made up of spar elements extending in the longitudinal direction and a plurality of rung bars extending in the transverse direction, which are combined together in the form of a ladder to define successive recesses where the rollers are accommodated for free rotation, one to each recess. The rung bars are made concaved midway between their lateral edge regions, just which come into sliding contact with the associated roller.

Meanwhile, the prior linear motion guide unit using rolling elements of cylindrical roller enables to carry larger load compared with the linear motion guide unit of another type having balls, but vulnerable to an adverse happening where the rolling axis of the roller would be tilted when the load varies, that is to say, the roller might be likely to experience any skew movement. Moreover, the conventional linear motion guide units of the sort as stated earlier, as undergoing a large thrust load in the axial direction thereof after the roller has moves on the skew, is much tough in posture control of the roller.

Compared with the linear motion guide unit of the sort having the balls, the linear motion guide unit using the cylindrical rollers is less in space to reserve lubricant therein for lubrication of the rollers rolling through the recirculation circuit. In addition, the roller, unlike the ball, is apt to have any danger of the stripping of lubricant from the rolling surface of the roller. Thus, the linear motion guide unit using the cylindrical rollers needs more frequent replenishment of lubricant.

With the roller chain constructed as recited earlier, any interval between any leading and trailing rollers is made up for the associated separator and, therefore, it is tough to make certain of the provision of space enough to reserve lubricant therein. With the linear motion guide unit of the sort constructed to use the roller chain, moreover, inside guide walls making sliding contact with axially opposite circular ends of the roller are made of other members, which are prepared separately from the slider carriage. This construction is unsuitable for carrying large thrust loads against the axially opposite circular ends of the roller. Instead, an alternative construction is developed in which the roller is sandwiched between any leading and trailing separators to be prevented from moving on the skew.

The roller chain constructed as stated just earlier is needed to make a clearance between the roller and any one of the leading and trailing separators as small as possible to keep the roller against movement on the skew while allowing the roller to make free rotation. To cope with this, the roller chain had to make it by any specific production process including, for example integral molding. With the roller chain constructed as stated just earlier, the spar elements of the carrier belt experience repeatedly partial flexure midway any two adjacent separators jointed to the spar elements because the separators are made resistant against flexure. Thus, the prior carrier belts are easy to suffer bending fatigue.

With the roller chain made as stated earlier in the form of the ladder in which a pair of lengthwise spar elements is connected together with successive separators or lung elements that are spaced away from one another at a fixed interval, the separators are each made of a rectangular plate that is jointed to the spar elements at only middle areas in height on the lateral edge regions thereof. As a result, the separators of rectangular plates jointed to the spar elements at only middle areas in height on the lateral edge regions thereof, since easily coming into engagement at their contours with any other member, may suffer any unwilling accidental loads, so that they are tough to continue keeping their proper posture with steady. Moreover, the separators, as made concaved midway between their lateral edge regions, are rendered less in thickness and eventually blamed for the reduction in mechanical strength of the roller chain. Besides, as the separators are made resistant against flexure, the spar elements experience repeatedly partial flexure and thus are easy to suffer bending fatigue.

SUMMARY OF THE INVENTION

The present invention, therefore, has as its primary object to overcome the major problems discussed earlier of the prior roller chain, and in particular to provide a roller chain in which more than one rolling element of cylindrical roller is guided certainly on axially opposite circular ends thereof to be kept against moving on the skew even under carrying high loads while a carrier belt is made to have a large space to reserve lubricant therein, whereby the carrier belt helps ensure that the roller runs steadily while following a circuit made precisely in a carriage. The present invention is further envisaged to provide a guide unit high in operational speed, mechanical strength and accuracy, and in particular to provide a guide unit in which the roller chain fits in a recirculation circuit made in a combination of a guide rail and a slider, which are allowed to move relatively to one another, and in which the roller is allowed to roll through a race while guided smoothly, steadily on the axially opposite circular ends thereof between confronting guide surfaces of the carriage and a retainer plate.

The present invention is concerned with a roller chain comprising more than one rolling element of roller, and a carrier belt easy to incur elastic bending with the rollers being arranged on the carrier belt in succession;

wherein the carrier belt has a pair of continuous bands spaced away from one another and extended lengthwise across areas set off-centre from axes of the rollers to carry axially opposite ends of the rollers across circular areas, and more than one separator of U-type viewed in a lengthwise direction of the carrier belt to join the continuous bands together with one another; and wherein the U-type separators are spaced lengthwise away from one another to provide a preselected interval between any two adjacent separators, in which the roller fits for rotation in a way coming into rolling contact with the associated separators at only axially spaced circular areas around a circular rolling surface thereof.

In one aspect of the present invention, a roller chain is disclosed, in which the U-type separators are each composed of a pair of legs spaced away from one another that are joined to their associated continuous bands at their ends on one side with respect to a centre plane extending through axes of the rollers arranged in succession, and a bridge merged with their associated legs at opposite ends thereof on other side with respect to the centre plane extending through axes of the rollers, the bridge being provided with eaves extending over the rolling surfaces of the associated rollers to keep the rollers against falling away from the carrier belt.

In another aspect of the present invention, a roller chain is disclosed, in which the legs stand such that their middle areas between the continuous bands and the bridges lie substantially on the centre plane extending through the axes of the rollers.

In another aspect of the present invention, a roller chain is disclosed, in which a clearance is defined within the U-type separator in the carrier belt, and a lubricant applicator fits into the clearance.

The present invention is further concerned with a guide unit comprising a guide rail, a slider allowed to move relatively to the guide rail by virtue of more than one rolling element of roller, and a roller chain installed in the slider and composed of a flexible carrier belt allowed to bend into a curved form and the rollers lying sequentially one after another along the flexible carrier belt;

wherein the carrier belt has a pair of continuous bands spaced away from one another and extended lengthwise across areas set off-centre from axes of the rollers to carry axially opposite ends of the rollers, and more than one separator of U-type viewed in a lengthwise direction of the carrier belt to join the continuous bands together with one another, the U-type separators being spaced lengthwise away from one another to provide a preselected interval between any two adjacent separators, in which the roller fits for rotation in a way coming into rolling contact with the associated separators at only axially spaced circular areas around a circular rolling surface thereof; and wherein the roller chain is installed in a recirculation circuit composed of a loaded race defined between the guide rail and the slider, and a non-load area that is made up of a return passage made in the slider and turnarounds made in the slider to communicate the loaded race with the return passage to allow the chain roller to turn about in rolling direction.

In another aspect of the present invention, there is disclosed a guide unit in which the slider is composed of a carriage having a raceway surface to provide the loaded race where the roller are allowed to roll through there and having the return passage therein, end caps secured to forward and aft ends of the carriage, one to each end, and provided therein with the turnarounds, and a retainer plate arranged in opposition to the carriage to cooperate with the carriage to guide the roller chain.

In another aspect of the present invention, there is disclosed a guide unit in which the rollers, when rolling through the load race, are born or carried at their axially opposite centre areas, lying on the centre plane extending through the axes of the rollers, of the axially opposite circular ends of the rollers, against and guided along a guide surface lying on the carriage at right angles relative to the associated raceway surface of the carriage.

In a further another aspect of the present invention, there is disclosed a guide unit in which wherein the guide surface of the carriage to guide the rollers at their axially opposite circular ends is worked at a time simultaneously with cutting of the associated raceway surface on the carriage.

In another aspect of the present invention, there is disclosed a guide unit in which the carrier belt is placed in the load race with any one of the continuous bands lying in a guide groove cut in the carriage along an area where the raceway surface and the guide surface merge with one another while the other continuous band fitting in a guide recess cut in the retainer plate in adjacency with a guide surface on the retainer plate.

In a further another aspect of the present invention, there is disclosed a guide unit that is applicable especially to a linear motion guide unit.

With the roller chain constructed as stated earlier, the rollers are held in the carrier belt in a way hard to move on the skew. As the carrier belt is made in a distinctive construction that allows the elastic carrier belt to more flexibly bend into any curved form, moreover, the roller chain of the present invention is superior in durability and well conform to any winding race including the recirculation circuit, and so forth. The clearance remaining in the U-type separator of the carrier belt serves to provide positively a large space to reserve lubricant sufficient to ensure good lubrication. In addition, the roller chain of the present invention is well suitable for the guide units, which require high stiffness and high-speed sliding performance.

Figure 10:
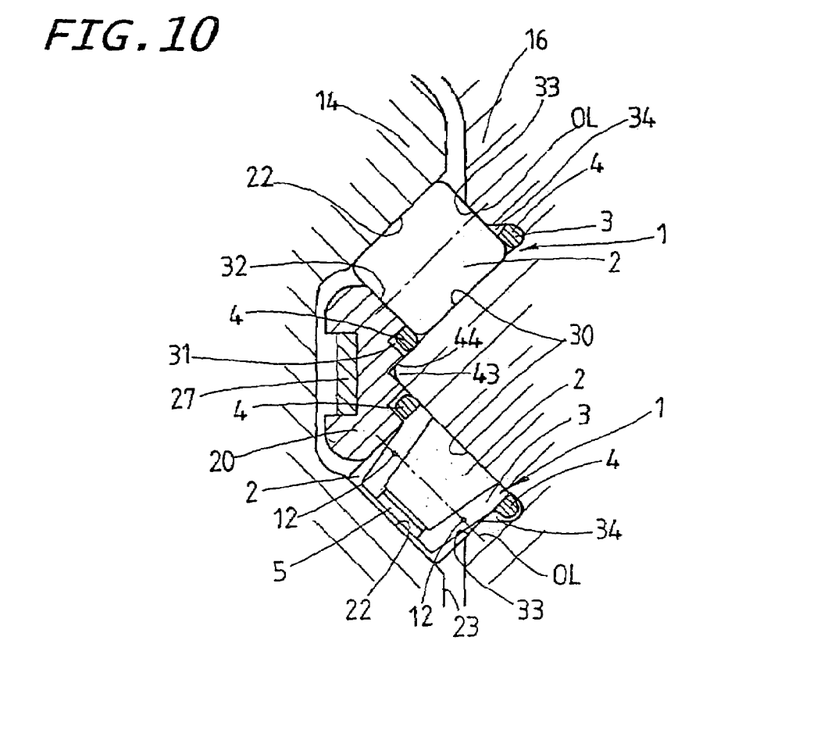
FIG. 10 is an enlarged fragmentary view in section showing in detail an area encircled with R in FIG. 9.

With the guide unit in which the roller chain constructed as recited earlier is installed in the race of the recirculation circuit, the rolling element of cylindrical roller, as shown in FIG. 10, can be carried at any one of axially opposite circular ends thereof, especially at a centre circular area around a roller axis, against the guide surface of the carriage. Besides, the guide surface of the carriage can be is worked by finish-cutting done at a time simultaneously with the cutting of the raceway surface on the carriage. Working both the guide surface and the raceway surface at the same time ensures the combined provision of the guide surface with raceway surface with accuracy to help make certain of smooth rolling of the rollers through the race.

The above and other related aspects and features of the present invention would be apparent from a reading of the following description of the disclosure found in the accompanying drawings and the novelty thereof pointed out in the appended claims.

DETAILED DESCRIPTION OF THE PREFERRED EMBODIMENTS

A roller chain according to the present invention will be readily appreciated by reference to the following detailed description when considered in connection with the accompanying drawings.

The roller chain of the present invention is expected for the application in a diversity of guide units including a linear motion guide unit, curvilinear motion guide unit, finite linear motion unit, and so forth. Moreover, a guide unit of the present invention having installed the roller chain 1 therein is adapted for extensive use between two machine members that move or travel relative to one another in diverse machines including, for example semiconductor manufacturing machines, machine tools, industrial robots, precision assembly machines, and so forth, which require high stiffness, high-speed sliding performance, high-acceleration sliding performance, and so on.

Constructional features of the present invention reside in a guide unit mainly comprised of an elongated guide rail 14 and a slider 15 that fits over and conforms to the guide rail 14 for relatively sliding movement, and especially a roller chain 1 adapted to be installed in the guide unit constructed as stated earlier. The roller chain 1 is envisaged to fit into a recirculation circuit 38 in the slider 15, and features a carrier belt 3, which is prepared for the construction of the roller chain 1.

More particularly, the roller chain 1 features that the carrier belt 3 is composed of a continuous band 4 and a U-type separator 6. Moreover, the guide unit discussed later features the construction desirable to take advantage of the roller chain 1 in which more than one rolling element of cylindrical roller 2 fits into the carrier belt 3.

With the linear motion guide unit of the present invention installed with the roller chain 1 in which more than one roller 2 fits into an interval between any two adjacent separators 6 of the carrier belt 3, the roller 2, as shown in FIG. 10, is born or carried at any one of axially opposite circular ends 37, especially at a centre circular area around a roller axis, against a fore-and-aft guide surface 33 of a carriage 16. Besides, the fore-and-aft guide surface 33 of a carriage 16 can be is worked with accuracy by finish-cutting done at a time simultaneously with the cutting of a raceway surface 30 on the carriage 16.

Referring to FIGS. 1 to 7, there is shown the roller chain constructed according to the present invention.

The roller chain 1 is mainly comprised of a flexible carrier belt 3 that is bendable into a curved form, and many rolling elements of cylindrical roller 2 lying sequentially one after another along the flexible carrier belt 3. The rollers 2, as shown in FIGS. 4 to 7, are arranged side by side lengthwise in the carrier belt 3 at a preselected interval with their axes lying normal to the longitudinal direction of the carrier belt 3 while their rolling surfaces lying in parallel with one another.

The carrier belt 3 is mainly comprised of a pair of widthwise spaced continuous bands 4 made of slender strips rectangular in transverse section, and a plurality of U-type separators 6 to join the continuous bands 4 together. The continuous bands 4 lie to extend lengthwise along sidewise spaced zones so as to carry or bear axially opposite ends 37 of the roller 2 across circular outer peripheries set off-centre from an axis O of the roller 2. The U-type separators 6 are spaced away from each other to provide intervals in which the rollers 2 are allowed to fit for free rotation therein, one to each interval. The U-type separators 6 are spaced away from each other lengthwise of the continuous belts 4 and made integral with the continuous belts 4. Moreover, the U-type separators 6 are each composed of a pair of legs 8 joined together with their associated continuous bands 4, and a horizontal bridge 9 interconnecting the sidewise spaced legs 8 with each other.

With the roller chain 1 stated earlier, the paired continuous bands 4 and many U-type separators 6 are all made integrally by the use of any mold that is made into two parts so that the carrier belt 3 can be withdrawn. The rollers 2 fit into the intervals 7, one to each interval, which is defined by a sidewise distance b spanning the continuous bands 4 spaced sidewise away from each other, refer to FIG. 7, and a lengthwise distance a between any two adjacent separators 6, refer to FIGS. 5 and 6. With the carrier belt 3 discussed earlier, the U-type separators 6 are arranged along the continuous bands 4 so as to separate any two adjacent rollers 2 away every one roller. As an alternative, nevertheless, the U-type separators 6 may be provided so as to space the adjacent rollers 6 away every two rollers.

Overall the U-type separators are each made in an inverted U-shape when viewed in the lengthwise direction of the carrier belt 3, and is composed of a pair of the sidewise spaced legs 8 that are joined to their associated continuous bands 4 at their ends on one side with respect to a centre plane OL extending through axes O of the rollers 2 arranged in succession, and the bridges 9 that are merged with their associated legs 8 at their sidewise opposite ends on other side with respect to a centre plane OL extending through axes O of the rollers 2 arranged in succession. Thus, the legs 8 stand such that their middle areas between opposite ends lie substantially on the centre plane OL extending through axes O of the rollers 2. In other words, the legs 8 are joined together with the associated continuous bands 4 at their one side below the centre plane OL extending through axes O of the rollers 2 when viewed in FIG. 2 while merged in integral with the associated bridges 9 at their other side above the centre plane OL extending through axes O of the rollers 2 when viewed in FIG. 2.

The U-type separators 6 are positioned on the continuous bands 4 at regular intervals in the lengthwise direction of the carrier belt 3 so as to separate any leading and trailing adjacent rollers 2 away from one another. The legs 8 extend from one side or their bottom ends to other side or their top ends across the centre plane OL extending through axes O of the rollers 2 up to a height h less than a diameter D of the roller 2. Thus, the rollers 2 are allowed to roll through the recirculation circuit 38 without colliding against any bridge 9, because there is no bridge 9 of the leg 8 raised above any rolling surface 45 of the roller 2.

Figure 1:
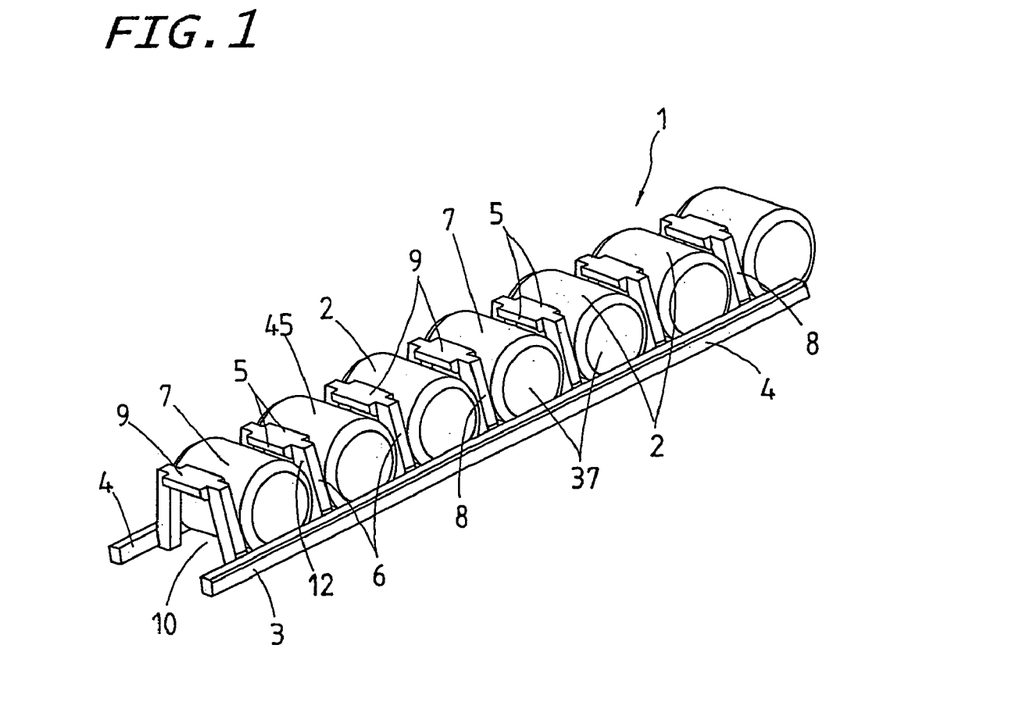
FIG. 1 is a fragmentary perspective view showing a preferred embodiment of a roller chain according to the present invention.
Figure 2:
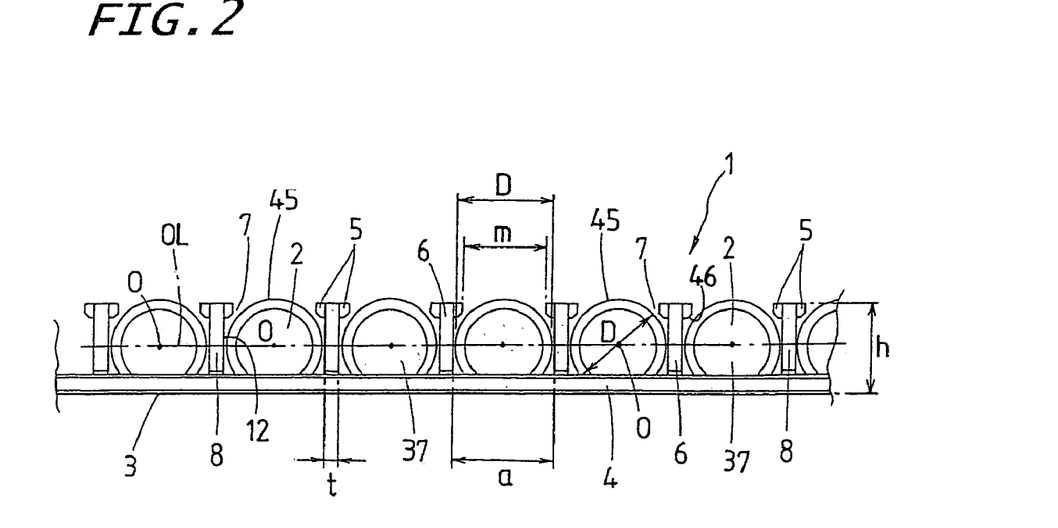
FIG. 2 is a fragmentary view in front elevation of the roller chain shown in FIG. 1.
Figure 3:
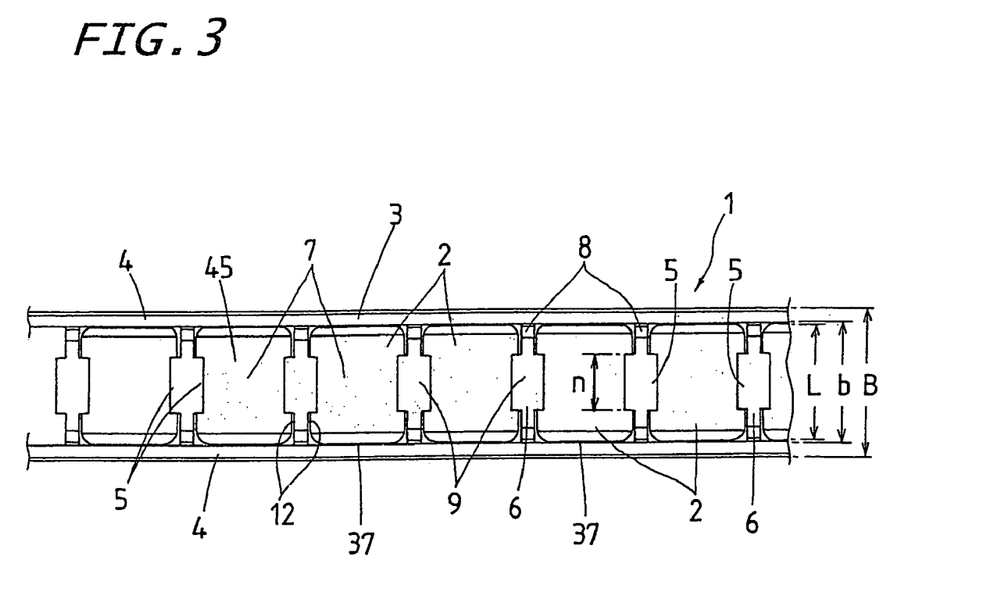
FIG. 3 is a fragmentary plan view of the chain roller in FIG. 2.

Moreover, the bridges 9 are each provided with eaves 5 to keep the associated roller 2 against falling away from the carrier belt 3. The eaves 5 extending from the bridges 9 over the rolling surfaces 45 of the rollers 2 have surfaces 46 facing their associated rollers 2, which are made slant to conform to the rolling surfaces 45 of the rollers 2, thereby making sure of retaining more securely the associated rollers 2 against falling away from the carrier belt 3. The eaves 5 are positioned on the other side that is set off-center from the centre plane extending through axes O of the rollers 2 arranged in succession. The eaves 5 also extend in the direction orthogonal to the continuous bands 4 while lying in parallel with the axis O of the associated roller 2. Moreover, the eaves 5 of any one of the U-type separators 6 extend towards other eaves 5 of any adjoining separators 6 to an extent that there remains a clearance or spacing m between the opposed eaves 5, which is less than the diameter D of the associated roller 2 lying between the leading and trailing separators 6 as shown in FIG. 2. Thus, the eaves 5 serve to keep the roller 2, once fit in the interval 7 between the continuous bands 4, against escape out of the carrier belt 3. In other wards, as the prevention of escape of the rollers 2 away from the carrier belt 3 is accomplished by the existence of the eaves 5, the rollers 2, once fit into the intervals 7 of the carrier belt 3, will not dismantled out of the associated intervals 7 in reverse. As an alternative, although not shown, the carrier belt 3 may be, for example, constructed such that either the continuous bands 4 are worked by plastic-forming to have any inwardly directed ridge or the legs 8 are made at their bottom ends thereof with raised portions on lengthwise opposite sides in order to prevent the rollers 2 from falling away out of the carrier belt 3 at the bottom side of the legs 8 to which the continuous bands 4 is joined together. With the alternative version stated just above, rollers 2 are allowed to fit into the intervals 7 by just getting either one of the bands 4 and legs 8 to make somewhat any elastic deformation, followed by forcing the rollers into the intervals 7.

With the carrier belt 3 constructed as stated earlier, the paired legs 8 each have leading and trailing flanks that are allowed to come into rolling contact with the rolling surfaces 45 of the rollers 2 at only their axially spaced circular areas, thereby controlling the associated rollers 2 so as not to move on the skew or guiding the rollers 2 with no tilt. Moreover, the sidewise opposite legs 8 of the U-type separators 6, as seen from FIG. 7, stand in a way tilted towards each other at θ degrees inclines with respect to a horizontal plane including a pair of continuous bands 4. A widthwise inside dimension b between the sidewise opposite continuous band 4 is made somewhat less than an axial length L of the roller 2. Overall, the U-type separator 6 is arranged between the sidewise opposite bands 4 in inverted U-shape posture.

Figure 4:
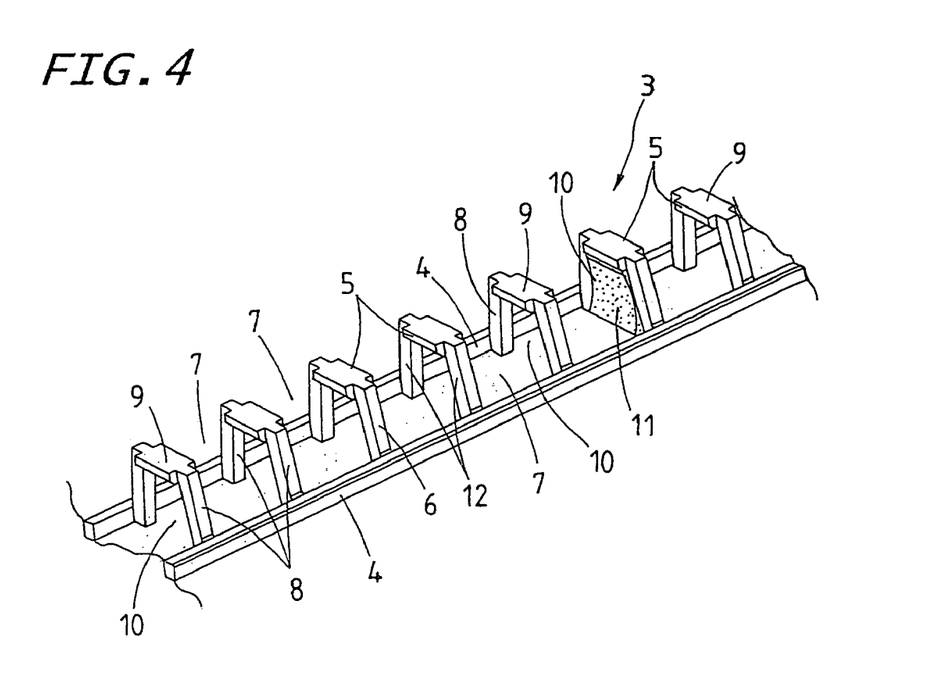
FIG. 4 is a fragmentary perspective view showing a carrier belt for the roller chain in FIG. 1, but in which the rollers are removed.
Figure 5:
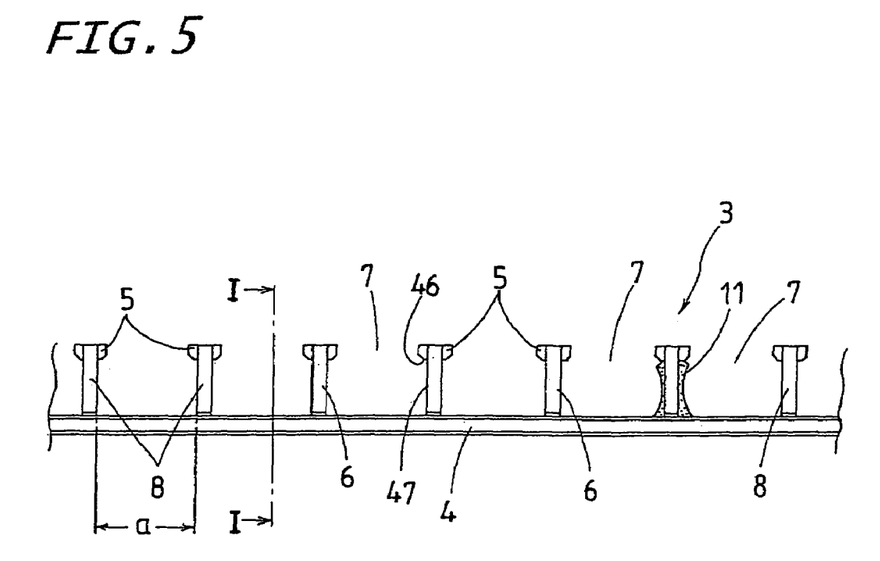
FIG. 5 is a fragmentary view in front elevation of the carrier belt in FIG. 4.
Figure 6:
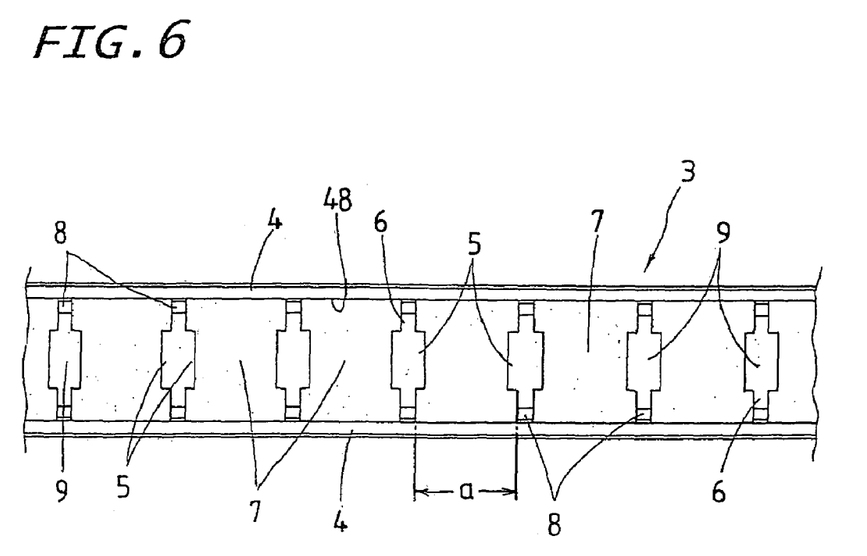
FIG. 6 is a fragmentary view in plan elevation of the carrier belt in FIG. 5.
Figure 7:
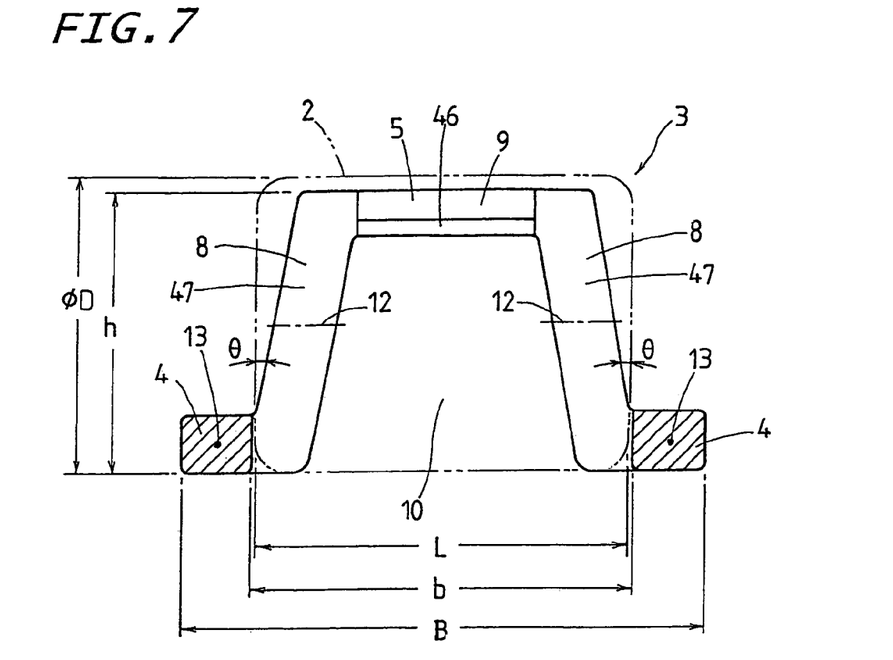
FIG. 7 is a transverse section of the carrier belt in FIG. 5, the view being taken on the plane of the line I—I in the figure.
Figure 8:
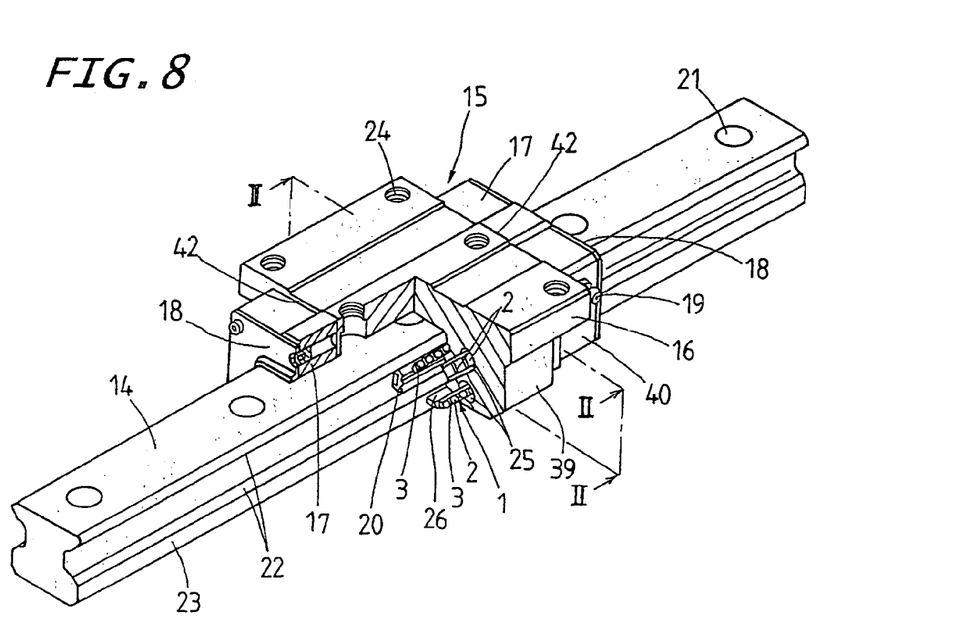
FIG. 8 is a perspective view, partially broken away, showing a preferred embodiment of a linear motion guide unit where the roller chain of FIG. 1 is installed therein.

After the rollers 2 have fit into their respective intervals 7 in the carrier belt 3, there remain a clearance 10 defined with the paired legs 8 and the bridge 9. The clearance 10 remaining in the carrier belt 3 serves as a reservoir to hold therein any lubricant such as grease and so on. As shown in FIGS. 4 and 5, any lubricant applicator 11 is allowed to fit into the clearance 10 in the carrier belt 3 to make sure of positively applying the lubricant to the roller 2. The lubricant applicator 11 fit in any preselected clearance 10 in advance helps make sure of good lubrication. The lubricant applicator 11 is made of either any cellular member of sintered resinous material impregnated with lubricant or any solid member of admixture of resinous material and lubricant, which is subsequently solidified under heating. The spatial area defined with any two adjacent U-type separators 6 and the sidewise opposite continuous bands 4 as shown in FIG. 6 provides the interval or pocket 7 to accommodate the roller 2 therein. The continuous bands 4 are made of synthetic resin to render overall the carrier belt 3 easy to incur elastic bending. Thus, the continuous bands 4 may be formed by any working process of either machining process or molding process including injection, extrusion and so forth using any mold that is made into two parts so that the continuous belts 4 can be withdrawn. As an alternative version, moreover, the carrier belt 3 may be enhanced in stiffness with any reinforcing wire 13 including stainless steel wires, and so on, which is embedded in the cores of the continuous bands 4 as shown in FIG. 7.

The guide unit of the present invention will be described hereinafter with reference to FIGS. 8 to 12.

The guide unit discussed later is a linear motion guide unit of the type in which a slider 15 is guided by virtue of more than one rolling element of cylindrical roller. The linear motion guide unit is mainly comprised of a guide rail 14 and a slider 15 that fits over the guide rail 14 for linear movement relatively to the guide rail 14. Especially, the guide unit of the present invention is distinguished by the construction where the roller chain stated earlier is installed in a recirculation circuit 38 defined with the combination of the guide rail 14 with the slider 15.

The rollers 2 fit for rolling movement in a load race 36 that is defined between a raceway surface 22 extending lengthwise of the guide rail 14 and a raceway surface 30 made in a carriage 16 of the slider 15 in opposition to the raceway surface 22. The carriage 16 has threaded holes 24, which are used to fasten the slider 15 to any other machinery. The guide rail 14, moreover, has counter-bored holes 21, which are used to fasten the guide rail 14 to any other machinery. An end cap 4 is provided with a grease nipple 13 to feed lubricant into the recirculation circuit 38.

Figure 9:
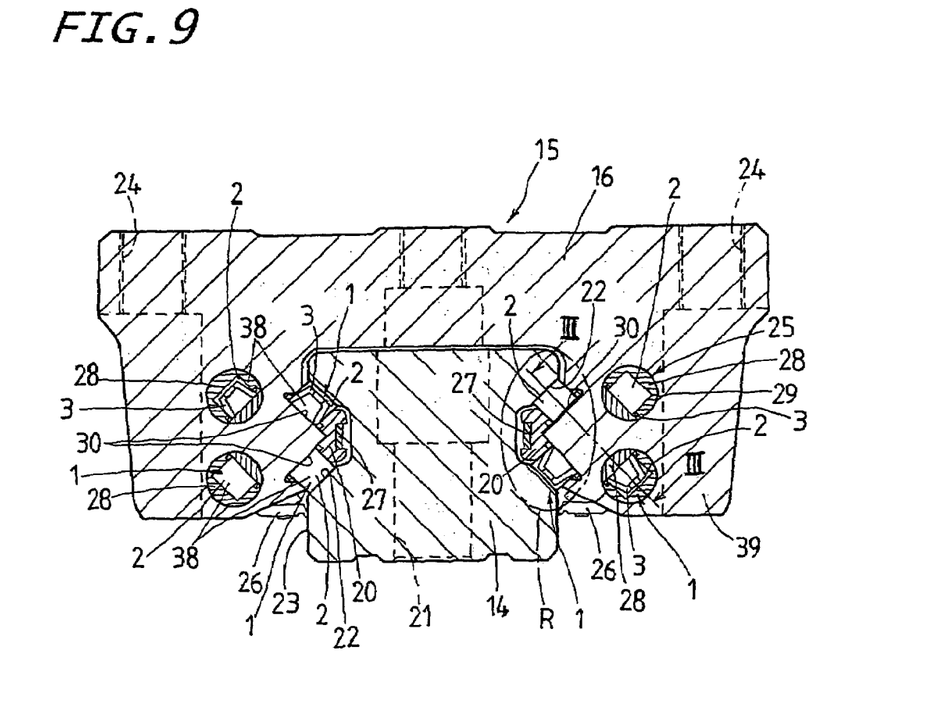
FIG. 9 is a view in transverse section on the plane of the line II—II showing the linear motion guide unit of FIG. 8.
Figure 11:
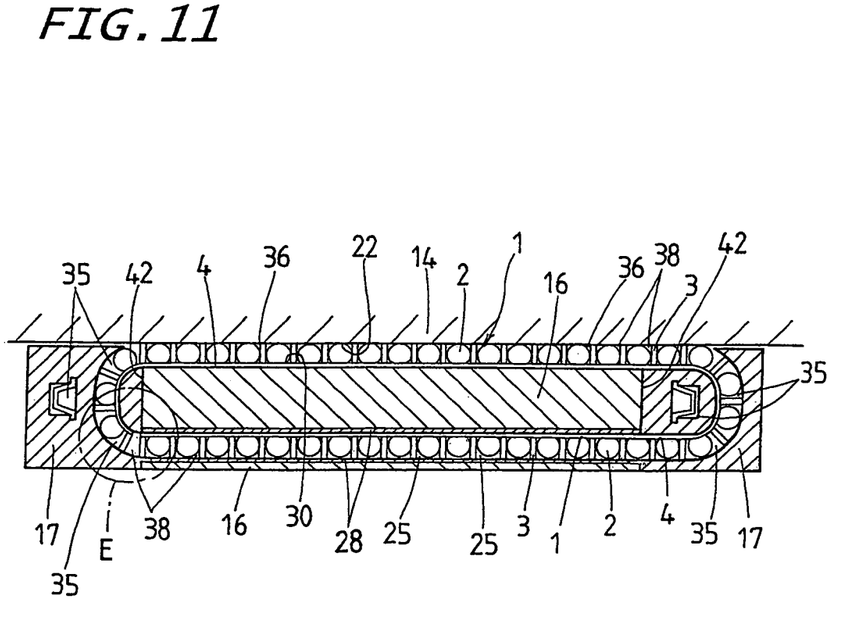
FIG. 11 is a view in longitudinal section on the plane of the line III—III showing a recirculation circuit in the linear motion guide unit of FIG. 9.

The guide unit of the present invention is constructed in a linear motion guide unit in which the guide rail 14 as shown in FIG. 9 has four rows of the raceway surfaces 22 that are provided on the longitudinal sides 23 thereof, two rows to each side. In the linear motion guide unit with four rows of races constructed as stated earlier, as shown in FIGS. 9 and 11, the slider 15 has sidewise opposing wings 40 in which non-loaded areas of the recirculation circuits 38, which are made up of return passages 25 in the carriage 16 and turnarounds 35 in the end caps 17. On each longitudinal side 23 of the guide rail 14, there are provided two rows of the recirculation circuits 38 where any one of load races 36 communicates with any one of the return passages 25 while the other load race 36 communicates with the other return passages 25 through the associated turnarounds 35 that are arranged in the fore and aft end caps 17 to make the recirculation circuits 38 intersect each other at their turnarounds 35.

As seen from FIG. 11, the recirculation circuits 38 are each composed of the load race 36, return passage 25, and fore and aft turnarounds 35. In FIG. 11, moreover, any one of the paired recirculation circuits 38 is depicted to illustrate all the load race 36, return passage 25 and fore and aft turnarounds 35, while the other recirculation circuit 38 is displayed only at the fore and aft turnarounds 35 other than the load race 36 and return passage 25 thereof. Both the load races 36 and the return passages 25 are made in the carriage 16 while the fore and aft turnarounds 35 are cut in the fore and aft end caps 17, which are attached on the fore and aft ends 42 of the carriage 16, one to each end.

The construction where the recirculation circuits 38 intersect one another is made at the turnarounds 35 in the fore and aft end caps 17 in such a way any radially outside turnaround 35 crosses the other radially inside turnaround 35 at right angle with one another. Any one recirculation circuit 38 is, for example, made up of one load race 36, one radially outside turnaround 35 in any one of the fore and aft end caps 17, one return passage 25 and one radially inside turnaround 35 in the other end cap 17, while the other recirculation circuit 36 includes the other load race 36, one radially inside turnaround 35 in the one of the fore and aft end caps 17, the other return passage 25 and one radially outside turnaround 35 in the other end cap 17.

The slider 15 includes the carriage 16 having therein the raceway surfaces 36 to provide the load races 30 and the return passages 25 to allow the roller chain 1 rolling back from any one of forward and aft ends of the load race 30 to other end, the end caps 17 secured to the forward and aft end faces 42 of the carriage 16, one to each end face, and made therein with the turnarounds 35 where the roller chain 1 is allowed to turn about in rolling direction, and retainer plates 20 lying in opposition to the carriage 16 to cooperate with the carriage 16, thereby keeping the roller chain 1 in place. Moreover, end seals 18 are attached on outside ends of the end caps 17, one to each end cap, while a bottom seal 26 is mounted underneath the slider 2 so as to seal throughout the bottom surface extending over the associated wing 39 of the carriage 16 and the associated wings 40 of the end caps 17.

Figure 12:
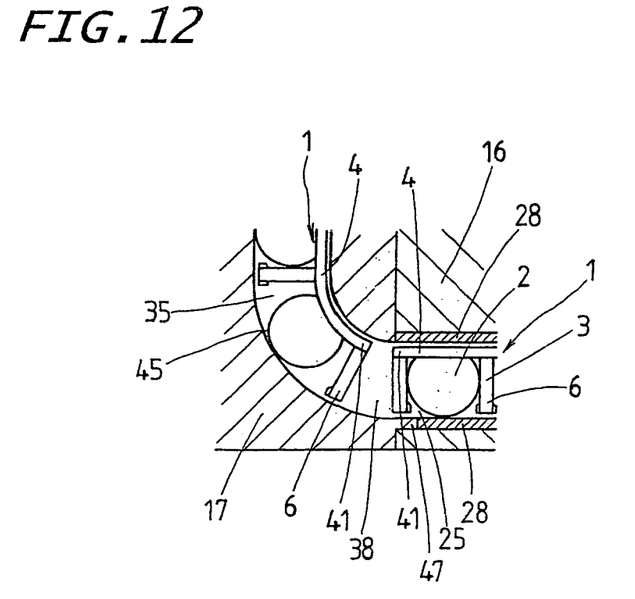
FIG. 12 is an enlarged fragmentary view in section showing in detail a turnaround area encircled with E where the roller chain is allowed to turn round through the recirculation circuit in FIG. 11.

The return passages 25 in the carriage 16 are each formed within a sleeve 28 installed in a bore 29 extending fore-and-aft in the carriage 16. The sleeve 28 has forward and aft ends formed to make fit-engagement with inside end surfaces of the end caps 17. As shown in FIGS. 11 and 12, the sleeve 28, for example, has the forward and aft ends, which are made at their radially inside areas of the recirculation circuit 38 so as to come into abutment against the inside end surfaces of the end caps 17, while at their radially outside areas of the recirculation circuit 38 so as to recede apart from the inside end surfaces of the end caps 17. Complementarily, the inside end surfaces of the end caps 17 are made to have partial projections 47, which will jut into the bore 29 in the carriage 16 at their associated receding areas of the sleeve 28 to make fit-engagement between the end caps 17 and the carriage 16.

The sleeve 28, because of constructed as stated earlier, helps secure certainly the end caps 17 to the carriage 16, making sure of smooth rolling of the rollers 2 through the recirculation circuit 38, which is made up of the load race defined between the raceway surface 22 on the guide rail 14 and the raceway surface 30 in the carriage 16, the turnarounds 35 cut in the forward and aft end caps 17, and the return passage 25. The guide unit of the present invention uses therein the roller chain 1 in a way the roller chain 1 is installed in the recirculation circuit 38 including the race in the guide unit, which is composed of the guide rail 14 and the slider 15 movable relatively of the guide rail 14.

The guide unit of the present invention has a retainer plate 20 fastened to the carriage 16 to keep the roller chain 1 between them. The retainer plate 20, is made with a fore-and-aft recess 44, which will fit over a fore-and-aft wedge 43 where the paired parallel raceway surfaces 30 merge with one another at a right angle. The retainer plate 20 is set in opposition to the carriage 16, and kept at lengthwise opposed ends thereof in place with binders, not shown. Lengthwise grooves 31 lying sidewise inside their associated raceway surfaces 32 flanks the fore-and-aft recess 44 of the retainer plate 20. When the carrier belt 1 travels through the load race 36, the fore-and-aft groove 44 receives therein any one of the continuous bands 4 of the associated carrier belt 1 to guide accurately the carrier belt 1. The rollers 2, when rolling through the load race 36 defined between the confronting raceway surfaces 22, 33 of the guide rail 14 and the carriage 16, are born or carried at their axially opposite circular ends 37, especially at centre circular areas around the roller axes OL, against and guided along both the fore-and-aft guide surface 33 lying on the carriage 16 at right angles relative to the associated raceway surface 30 of the carriage 16 and a guide surface 32 lying on the retainer plate 20 in opposition to the guide surface 33 on the carriage 16. Between the raceway surface 30 and the guide surface 33 in the carriage 16, there is provided a fore-and-aft groove 34 to guide lengthwise the other continuous band 4 of the carrier belt 1.

A feature of the guide unit according to the present invention resides in that the fore-and-aft guide surface 33 of the carriage 16 to guide the rollers 2 at their axially opposite circular ends 37 is worked at a time simultaneously with the cutting of the associated raceway surface 30 on the carriage 16. Thus, both the guide surface 30 and the raceway surface 33 are worked with high accuracy enough to ensure precise, smooth rolling of the rollers 2, making it possible to provide the guide unit operative with high accuracy even under any critical condition where the slider 15 is needed to make sliding movement with high-speed and high-acceleration.

Another feature of the guide unit according to the present invention resides in that the roller chain 1 is installed in the recirculation circuit 38 in a way making it possible to carry the rollers 2 at their axially opposite circular ends 37, especially at centre circular areas around the roller axes, against the fore-and-aft guide surface 33 of the carriage 16 to be guided along guide surface 33, as shown in FIG. 10. As a result, the rollers 2 are not only guided between their associated leading and trailing legs 8 of the carrier belt 3 so as not to move on the skew, but also controlled so as to be hard to experience any tilt, because of carried at their axially opposite circular ends, especially, at their centre circular areas around the roller axes. The carriage 16 is so made as to have sufficient stiffness to large thrust, or axial, loads. That is to say, the carriage 16 is constructed keep the rollers 2 against any rolling askew even under subjected to large thrust loads.

When the roller chain 1 is in the race 36, the rollers 2 roll through between the raceway surface 22 on the guide rail 14 and the raceway surface 36 in the carriage 16 in such a way that any one of their axially opposite circular ends 37 is carried against and guided along the guide surface 33 of the carriage 16 while the other of the circular ends 37 is carried against and guided along the guide surface 32 of the retainer plate 20. The carrier belt 3 is placed in the load race 36 with any one of the continuous bands 4 lying in the lengthwise groove 34 cut in the carriage 16 for wear relief along a corner where the raceway surface 30 and the guide surface 33 merge lengthwise with one another while the other continuous band 4 fitting in the lengthwise groove 31 in the retainer plate 20. As a result, the rollers 2 are allowed to continue to fit in the intervals 5 even after the guide rail 14 has been dismantled of the slider 15, so that the rollers 2 are kept against falling away out of the slider 15.

When the roller chain 1 moves through any of the return passages 25 and the turnarounds 35, moreover, the rollers 2 are carried against and guide along linear side walls of the return passages 25 and curved side walls of the turnarounds 35 at their axially opposite circular ends, especially, at their centre circular areas around the roller axes. This construction in the non-loaded areas of the recirculation circuit also helps make sure of smooth rolling recirculation of the rollers 2 with no tilt or no movement on the skew.

With the embodiment constructed as stated earlier, the retainer plate 20 is secured to the carriage 16 along a fore-and-aft area midway between the two rows of raceway surfaces 30 by using the backup plate 27. The carrier belt 3 rich in flexibility and resiliently bendable property because of constructed as stated earlier helps make the carrier belt 1 easier to install it in the recirculation circuit 38 of the linear motion guide unit, as shown in FIG. 11. Moreover, the roller chain 1 high in flexibility is much resistant to fatigue. After the roller chain 1 is once installed in the recirculation circuit 38, the carrier belt 3 is placed to form a loop where longitudinally opposite ends 41, as shown in FIG. 12, come into face-to-face relation with one another with the U-type separators 6 most distant from one another being directly opposed to one another. As an alternative, an additional roller 2 may be placed between the U-type separators 6, which come face to face with one another.

Assembly of the roller chain 1 with the linear motion guide unit is performed by, for example, first applying the roller chain 1 to the raceway surface 30 in the carriage 6, then getting the roller chain 1 going ahead through the turnarounds 35 in any one of the end caps 17, the return passage 25, the turnaround 35 in the other end cap 17, and finally back to the to the raceway surface 30 in the carriage 6. Meanwhile, the rollers 2 have fit into the carrier belt 3 preparatory to introduction of the roller chain 1 into the recirculation circuit 38. As an alternative, the roller 2 may be charged into their respective intervals 7 by getting the associated legs 8 bent or warped resiliently after only the carrier belt 3 has been completely introduced into the recirculation circuit 38. As a further another alternative version, the roller chain 1 may be first inserted into the load race after the guide unit has been dismantled of any one of the end caps 17. Subsequently, the roller chain 1 is applied to the dismantled end cap 17, which is in turn combined with the carriage 16 to finish the guide unit.

It will be understood that the roller chain, although not shown, may be made in any endless looped shape. With this version, only the carrier belt 3 of a preselected length is first placed in the recirculation circuit 38 in a way longitudinal ends 41 thereof come face to face with each other. Then, the longitudinal ends 41 are fused together to complete the looped form. Finishing the roller chain 1 may be as simple as thereafter charging the rollers 2 in the intervals 7, one to each interval. With the version made ready to take the slider apart from the guide rail, the guide unit is dismantled of the slider to expose the race to allow the roller chain 1 to fit into the race. After installation of the roller chain 1 into the associated race, the slider is assembled with the guide rail to finish the guide unit.

What is claimed is:

1. A roller chain comprising more than one rolling element of roller, and a carrier belt easy to incur elastic bending with the rollers being arranged on the carrier belt in succession;

wherein the carrier belt has a pair of continuous bands spaced away from one another and extended lengthwise across areas set off-centre from axes of the rollers to carry axially opposite ends of the rollers across circular, and more than one separator of U-type viewed in a lengthwise direction of the carrier belt to join the continuous bands together with one another; and wherein the U-type separators are spaced lengthwise away from one another to provide a preselected interval between any adjacent separators, in which the roller fits for rotation in a way coming into rolling contact with the associated separators at only axially spaced circular areas around a circular rolling surface thereof.

2. A roller chain constructed as defined in claim 1, wherein the U-type separators are each composed of a pair of legs spaced away from one another that are joined to their associated continuous bands at their ends on one side with respect to a centre plane extending through axes of the rollers arranged in succession, and a bridge merged with their associated legs at opposite ends thereof on other side with respect to the centre plane extending through axes of the rollers, the bridge being provided with eaves extending over the rolling surfaces of the associated rollers to keep the rollers against falling away from the carrier belt.

3. A roller chain constructed as defined in claim 1, wherein the legs stand such that their middle areas between the continuous bands and the bridges lie substantially on the centre plane extending through the axes of the rollers.

4. A roller chain constructed as defined in claim 1, wherein a clearance is defined within the U-type separator in the carrier belt, and a lubricant applicator fits into the clearance.

5. A guide unit comprising a guide rail, a slider allowed to move relatively to the guide rail by virtue of more than one rolling element of roller, and a roller chain installed in the slider and composed of a flexible carrier belt allowed to bend into a curved form and the rollers lying sequentially one after another along the flexible carrier belt;

wherein the carrier belt has a pair of continuous bands spaced away from one another and extended lengthwise across circular areas set off-centre from axes of the rollers to carry axially opposite ends of the rollers, and more than one separator of U-type viewed in a lengthwise direction of the carrier belt to join the continuous bands together with one another, the U-type separators being spaced lengthwise away from one another to provide a preselected interval between any two adjacent separators, in which the roller fits for rotation in a way coming into rolling contact with the associated separators at only axially spaced circular areas around a circular rolling surface thereof; and wherein the roller chain is installed in a recirculation circuit composed of a loaded race defined between the guide rail and the slider and a non-load area that is made up of a return passage made in the slider and turnarounds made in the slider to communicate the loaded race with the return passage to allow the chain roller to turn about in rolling direction.

6. A guide unit constructed as defined in claim 5, wherein the slider is composed of a carriage having a raceway surface to provide the loaded race where the roller are allowed to roll through there and having the return passage therein, end caps secured to forward and aft ends of the carriage, one to each end, and provided therein with the turnarounds, and a retainer plate arranged in opposition to the carriage to cooperate with the carriage to guide the roller chain.

7. A guide unit constructed as defined in claim 6, wherein the rollers, when rolling through the load race, are born or carried at their axially opposite centre areas, lying on the centre plane extending through the axes of the rollers, of the axially opposite circular ends of the rollers, against and guided along a guide surface lying on the carriage at right angles relative to the associated raceway surface of the carriage.

8. A guide unit constructed as defined in claim 7, wherein the guide surface of the carriage to guide the rollers at their axially opposite circular ends is worked at a time simultaneously with cutting of the associated raceway surface on the carriage.

9. A guide unit constructed as defined in claim 7, wherein the carrier belt is placed in the load race with any one of the continuous bands lying in a guide groove cut in the carriage along an area where the raceway surface and the guide surface merge with one another while the other continuous band fitting in a guide recess cut in the retainer plate in adjacency with a guide surface on the retainer plate.

10. A guide unit constructed as defined in claim 5, which is applicable to a linear motion guide unit.

* * * * *